US009194956B2

(12) United States Patent
Collier et al.

(10) Patent No.: US 9,194,956 B2
(45) Date of Patent: Nov. 24, 2015

(54) AMELIORATION OF FREQUENCY ERRORS AND/OR THEIR EFFECTS

(75) Inventors: James Digby Yarlett Collier, Cambridge (GB); Tim Newton, Cambridge (GB); Per-Ludvig Normark, Cambridge (GB); Thomas Renstrom, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 805 days.

(21) Appl. No.: 13/346,439

(22) Filed: Jan. 9, 2012

(65) Prior Publication Data
US 2013/0113654 A1 May 9, 2013

(30) Foreign Application Priority Data

Nov. 3, 2011 (GB) .................................. 1118975.0

(51) Int. Cl.
| | | |
|---|---|---|
| *G01S 19/23* | (2010.01) | |
| *G01S 19/24* | (2010.01) | |
| *G01S 19/37* | (2010.01) | |
| *G01S 19/29* | (2010.01) | |
| *G01S 19/30* | (2010.01) | |

(52) U.S. Cl.
CPC ............ *G01S 19/235* (2013.01); *G01S 19/243* (2013.01); *G01S 19/246* (2013.01); *G01S 19/29* (2013.01); *G01S 19/30* (2013.01); *G01S 19/37* (2013.01)

(58) Field of Classification Search
USPC ........................................ 342/357.62, 357.63
IPC .................. G01S 19/235,19/243, 19/246, 19/37
See application file for complete search history.

(56) References Cited

U.S. PATENT DOCUMENTS

| | | | |
|---|---|---|---|
| 6,041,222 A * | 3/2000 | Horton et al. ................. | 455/255 |
| 6,211,820 B1 | 4/2001 | Zou et al. | |
| 7,747,236 B1 * | 6/2010 | Poberezhskiy et al. ........ | 455/255 |
| 2005/0079846 A1 | 4/2005 | Sendonaris et al. | |
| 2007/0183484 A1 | 8/2007 | Brehler et al. | |
| 2007/0247357 A1 | 10/2007 | Lin | |
| 2007/0248152 A1 | 10/2007 | Wang et al. | |
| 2008/0272960 A1 * | 11/2008 | Kishimoto et al. ...... | 342/357.05 |

(Continued)

FOREIGN PATENT DOCUMENTS

| | | |
|---|---|---|
| EP | 1 501 201 | 1/2005 |
| EP | 2169417 | 3/2010 |

(Continued)

OTHER PUBLICATIONS

European Search Report for EP Application No. 11191423.0, dated Jul. 12, 2012.

(Continued)

*Primary Examiner* — Gregory C Issing
*Assistant Examiner* — Fred H Mull
(74) *Attorney, Agent, or Firm* — The Marbury Law Group, PLLC

(57) ABSTRACT

A radio communications device includes a location finder for determining the device's location based on satellite signals, a crystal oscillator whose output frequency acts as a controlling reference for the location finder and a processor for intermittently correcting the crystal oscillator such that the output frequency experiences jumps. The location finder is arranged to take account of the jumps in the determination of the device's location.

16 Claims, 11 Drawing Sheets

(56) References Cited

U.S. PATENT DOCUMENTS

2009/0029667 A1* 1/2009 Nakamoto .................. 455/295
2010/0069085 A1* 3/2010 Hammes et al. ........... 455/456.1
2010/0207743 A1* 8/2010 Jackson et al. ........... 340/310.11

FOREIGN PATENT DOCUMENTS

| EP | 2264477 | 12/2010 |
| WO | WO 01/79878 | 10/2001 |
| WO | WO 01/79878 A3 | 10/2001 |
| WO | WO 02/09310 | 1/2002 |
| WO | WO 03/028240 | 4/2003 |
| WO | WO 2005/066650 | 7/2005 |

OTHER PUBLICATIONS

Combined Search and Examination Report for GB Appln. No. GB1118975.0, dated Jun. 28, 2013.
Great Britain Search Report for Appln. No. GB 1118975.0, dated Nov. 12, 2012.
European Search Report dated Feb. 28, 2012.
Extended European Search Report for European Appln. No. 13189527.8, dated Nov. 25, 2013.

* cited by examiner

AMELIORATION OF FREQUENCY ERRORS AND/OR THEIR EFFECTS

CROSS-REFERENCES TO RELATED APPLICATIONS

This application claims priority to Great Britain Patent Application No. 1118975.0, filed Nov. 3, 2011, which is incorporated by reference herein in its entirety.

FIELD

The invention relates to the amelioration of frequency errors arising in digital communication systems and/or the amelioration of the effects of such errors on digital signal processing operations performed within such systems. For example, the invention may be applied in the field of satellite navigation systems.

BACKGROUND

To help put the invention into context, we will first briefly describe some salient points of the Global Positioning System (GPS).

The GPS comprises a set of orbiting satellites. The GPS has several modes of operation, e.g. the L1 mode and the L2 mode. In each of these modes, each satellite repeatedly transmits a navigation message. For the purposes of this document, the signal formed by the repeated transmission of a satellite's navigation message will be referred to as the satellite's payload signal. A GPS receiver is designed to receive these navigation messages and to use navigation messages from different satellites in combination in order to estimate the GPS receiver's position. The GPS satellites modulate their payload signals on to radio frequency carrier signals that are then transmitted for reception by GPS receivers.

In each operating mode of the GPS, the satellites all use the same radio frequency carrier signal, although different operating modes of the GPS do however use different radio frequency carrier signals. Therefore, GPS must provide a way for a GPS receiver to distinguish between payload signals that belong to the same GPS operating mode but which arrive from different satellites.

This is achieved by providing each satellite with a different Gold code and arranging that each satellite spreads its payload signal with its unique Gold code (unique, that is, within the set of GPS satellites) before modulating the payload signal on to a radio frequency carrier signal. Thus, a GPS receiver needs to despread a received payload signal with the correct Gold code and that allows a GPS receiver to not only distinguish between payload signals from different satellites but also to identify from which satellites the payload signals have been sent. Effectively then, GPS uses a form of code division multiple access (CDMA) in which Gold codes are used for the spreading/despreading.

SUMMARY

The invention is defined by the appended claims, to which reference should now be made.

BRIEF DESCRIPTION OF THE DRAWINGS

By way of example only, the invention will now be described by reference to the accompanying drawings, in which.

DETAILED DESCRIPTION

From the perspective of a GPS receiver, the basic steps that need to be performed on a radio signal received from a GPS satellite are:

- demodulation, in order to remove the RF carrier signal and recover the spread payload signal;
- despreading of the spread payload signal; and
- utilisation of the navigation messages in the despread payload signal.

It is often seen as efficient to design a GPS receiver so that radio signals received from GPS satellites are demodulated in a two stage process. The first stage down converts a radio signal received from a satellite into an intermediate frequency (IF) signal and the second stage down converts the IF signal to baseband, thus completing the recovery of the spread payload signal. Viewed from a different perspective, the first stage removes the bulk of the RF carrier signal but leaves the spread payload signal modulated on a residual carrier signal, which the second stage then strips away, in order to recover the spread payload signal.

Figure 1:
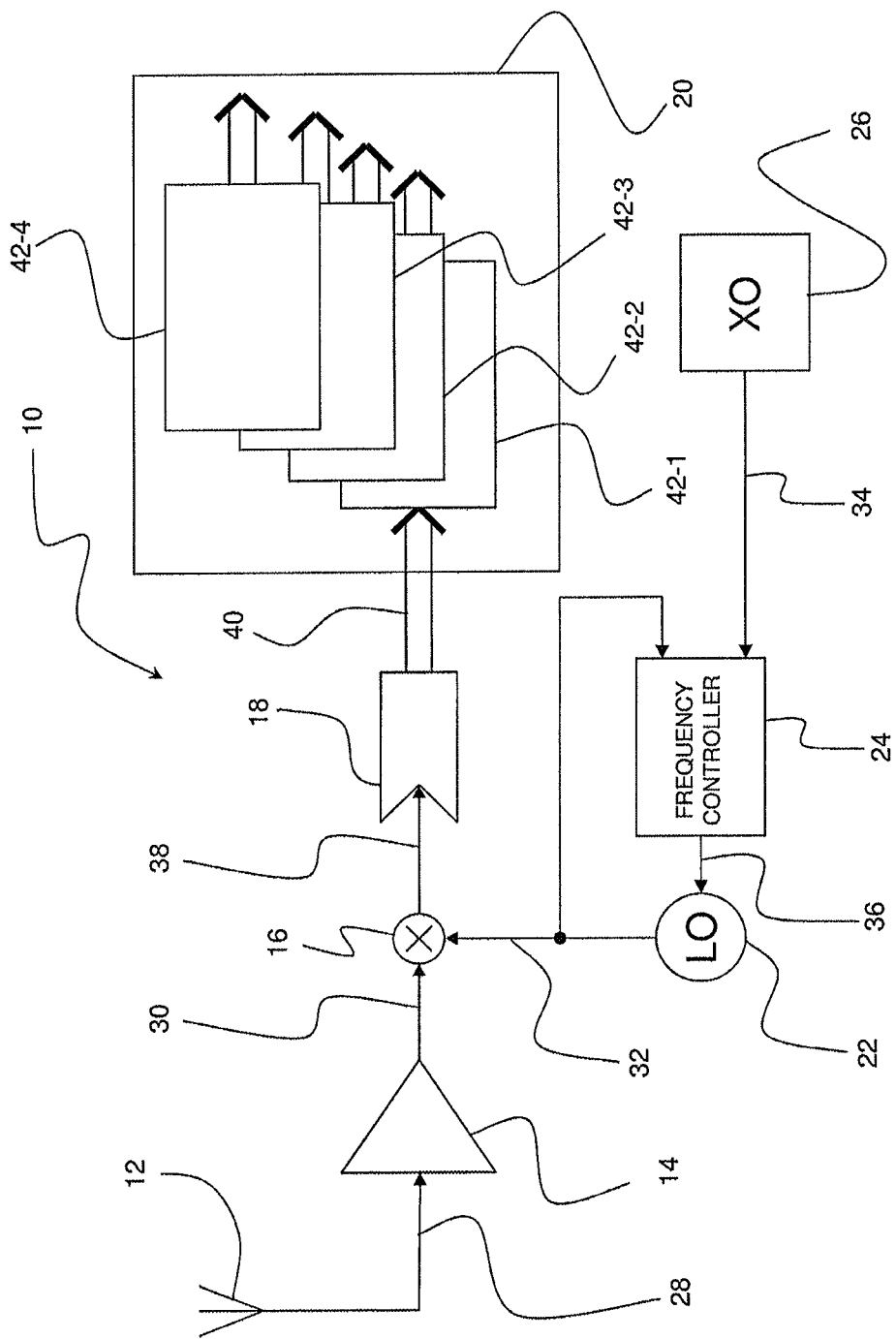
FIG. 1 is a schematic illustration of a GPS receiver.

From the point of view of a GPS receiver, the radio frequency carrier signals used by the satellites in a given mode vary. This variation is primarily due to the Doppler effect arising from relative motion between a GPS receiver and the orbiting satellites. A two stage demodulation process of the kind mentioned above enables a GPS receiver to apply a common first stage to all received radio signals belonging to the same mode and then employ separate and adaptable second stages for each satellite that the receiver is tracking. FIG. 1 schematically illustrates part of an exemplary GPS receiver 10 that uses such a two stage demodulation approach.

Shown in FIG. 1 are an antenna 12, an amplifier 14, a mixer/frequency converter 16, an analogue to digital converter (ADC) 18, a digital processing section 20, a local oscillator (LO) 22, a frequency controller 24 and a crystal oscillator 26. However, it will be apparent to the skilled person that in practice the GPS receiver 10 will include many other elements besides those shown in FIG. 1.

In operation, the signal 28 that is supplied by the antenna 12 is a superposition of the radio signals that are received by the antenna, which include any radio signals from any overhead GPS satellites. The signal 28 is amplified by amplifier 14 to produce signal 30. The amplified signal 30 emerging from amplifier 14 is then subjected to frequency down conversion in mixer 16. Mixer 16 performs down conversion by mixing signal 30 with the output signal 32 of the local oscillator 22. The oscillator signal 32 is maintained at a desired frequency by frequency controller 24.

The inputs to the frequency controller 24 are the oscillator signal 32 and a reference signal in the form of the relatively stable output signal 34 of the crystal oscillator 26. The frequency controller 24 derives from signals 32 and 34 a control signal 36 that is applied to a control input of the local oscillator 22. The frequency controller 24 aims to maintain a predetermined ideal relationship between frequencies of signals 32 and 34. If the relationship between the frequencies of signals 32 and 34 departs from its ideal state, then the frequency controller 24 responds by altering control signal 36 in a way which causes the local oscillator 22 to adjust the frequency of signal 32 by an amount sufficient to restore the ideal relationship between the frequencies of signals 32 and 34. In effect then, frequency controller 24 establishes a phase locked loop that attempts to lock the frequency of signal 32 relative to the frequency of signal 34 from the crystal oscillator 26.

The GPS receiver 10 is able to select the ideal relationship that is sought by the frequency controller 24 for the frequencies of signals 32 and 34 and thus is capable of setting the frequency of oscillator signal 32. The GPS receiver 10 will attempt to estimate its position by making calculations on received GPS satellite signals belonging to a particular GPS mode, hereinafter called the "employed mode". Accordingly, the GPS receiver 10 sets the frequency of signal 32 so that the down conversion performed by mixer 16 represents the first stage of the aforementioned two stage down conversion process for any GPS satellite signals in signal 30 that belong to the employed mode. That is to say, the mixer 16 will act on each GPS satellite signal belonging to the employed mode that is present in signal 30 by removing the bulk of the carrier signal to leave a spread payload signal modulated on a residual carrier signal.

The signal 38 that is produced by the mixer 16 is converted into a quadrature format digital signal 40 by ADC 18. The digital signal 40 is then supplied to the digital processing section 20. For each GPS satellite signal of the employed mode that is present in the signal 28, the digital signal 40 includes a corresponding spread payload signal modulated on a respective residual carrier signal. The digital processing section provides a tracking function for each of these payload signals. Four of these tracking functions are shown in FIG. 1, indicated 42-1 to 42-4. These tracking functions 42-1 to 42-4 all operate on the digital signal 40 and have the same basic structure as each other. That structure will now be described with reference to FIG. 2.

Figure 2:
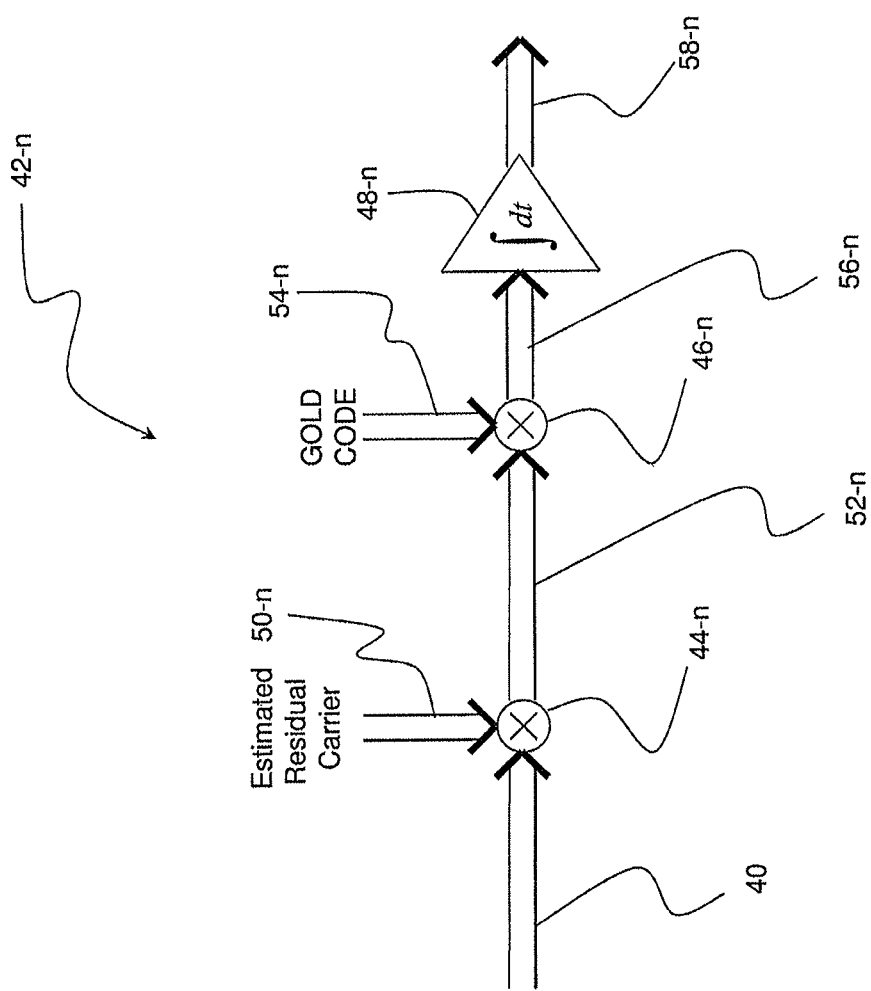
FIG. 2 is a schematic illustration of the $n^{th}$ tracking function in the digital processing section of the GPS receiver of FIG. 1.

Although FIG. 1 shows four tracking functions, there could in practice be more or fewer, depending on how may GPS satellites are visible to the GPS receiver 10 and on the maximum number of different payload signals of the employed mode the GPS receiver 10 has been designed to process. FIG. 2 therefore shows a generic $n^{th}$ tracking function, 42-$n$ for recovering and processing the payload signal of the employed mode for the $n^{th}$ observable satellite.

As shown in FIG. 2, tracking function 42-$n$ comprises two complex multipliers 44-$n$ and 46-$n$ and an integrator 48-$n$. Multiplier 44-$n$ multiplies the complex signal 40 with a complex signal 50-$n$. The purpose of multiplier 44-$n$ is to perform the second stage of the aforementioned two stage demodulation process to recover the spread payload signal of the $n^{th}$ tracked satellite. Therefore, the digital processing section 20 aims to tune the frequency of complex signal 50-$n$ to have same frequency as the residual carrier signal on which the spread payload signal of the $n^{th}$ observable GPS satellite is modulated within signal 40. This tuning is done by a carrier tracking loop in a known manner and the signal 50-$n$ is a estimate of the residual carrier signal. Complex signal 52-$n$ thus contains, amongst other things, a baseband version of the spread payload signal of the $n^{th}$ observable GPS satellite. The digital baseband section adjusts the frequency of complex signal 50-$n$ as necessary to match changes in the residual carrier frequency of spread payload signal of the $n^{th}$ observable GPS satellite in digital signal 40. These changes are due to, for example, the changing Doppler shift of the radio signal from the $n^{th}$ observable GPS satellite as perceived by the GPS receiver 10, and are detected by the GPS receiver 10 in a known manner.

Complex multiplier 46-$n$ and integrator 48-$n$ work in concert to despread the payload signal of the $n^{th}$ observable GPS satellite that is contained in signal 52-$n$, as will now be explained. As was mentioned earlier, each of the GPS satellites spreads its payload signals using a Gold code that is unique amongst the group of GPS satellites. At multiplier 46-$n$, the tracking function 42-$n$ multiplies the signal 52-$n$ with a complex signal 54-$n$ that is a cyclically repeated version of the Gold code of the $n^{th}$ observable GPS satellite. The complex output signal 56-$n$ of multiplier 46-$n$ is then processed by the integrator 48-$n$. The integrator 48-$n$ operates cyclically. In each cycle, the integrator 48-$n$ accumulates the complex values of digital signal 56-$n$ for a period that is equal to the duration of one cycle of the Gold code that is repeated in signal 54-$n$. At the end of each cycle, the integrator 48-$n$ outputs the complex value that the accumulation has reached and then resets the accumulation value to zero in order to begin the next integration cycle.

The stream of complex values that are thus emitted by the integrator 48-$n$ make up complex signal 58-$n$. Provided that the cycles of the Gold code in signal 54-$n$ are correctly time-aligned with the signal 52-$n$, the signal 58-$n$ will be a despread version of the payload signal. The Gold code that needs to be used in signal 54-$n$ and the correct time-alignment, relative to signal 52-$n$, of the cycles of that code in signal 54-$n$ are deduced by the GPS receiver 10 in a known fashion. The despread payload signal 58-$n$ is then used by the GPS receiver to make a position estimate.

Each sample of signal 58-$n$ has an in phase component and a quadrature component. The in phase component is given by:

$$I_{int} = \int I_{SIG} I_{GC} dt$$

$I_{SIG}$ and $I_{GC}$ are the in phase components of samples of signals 52-$n$ and 54-$n$, respectively.

Likewise, each quadrature Q component of signal 58-$n$ is given by:

$$Q_{int} = \int Q_{SIG} Q_{GC} dt$$

$Q_{SIG}$ and $Q_{GC}$ are the quadrature phase components of signals 52-$n$ and 54-$n$, respectively.

The values $I_{int}$ and $Q_{int}$ are known in the art as coherent integrals. The GPS receiver 10 also makes use of the following quantity:

$$S_{int} = \sum_{\tau} (I_{int}^2 + Q_{int}^2)$$

This is the sum of the square modulus of the signal 58-$n$ taken over a period time $\tau$. The quantity $S_{int}$ is known in the art as a non-coherent integral.

The quantities $S_{int}$, $I_{int}$ and $Q_{int}$ are clearly all sensitive to deviation of signals 52-$n$ and 54-$n$ from their proper time alignment. Such deviation will occur if the down conversion to baseband of the spread payload signal of the $n^{th}$ observable GPS satellite that is carried out by the concerted action of mixer 16 and multiplier 44-$n$ is, or becomes, imprecise. To avoid such errors in the two stage down conversion process, the PLL established by the frequency controller 24 aims to keep the output frequency of the local oscillator 22 accurately stabilised.

Given a starting condition where signals 52-$n$ and 54-$n$ assume their proper time alignment, if a phase difference of $\pi$ then develops between these signals, then complex samples of signal 56-$n$ would be combining destructively with samples of that signal that have been accumulated within the integrator 58-$n$. Therefore, it is desirable that the output frequency of the local oscillator 22 is stable to the extent that the phase difference between signals 40 and 50-$n$ that develops over the course of a single integration cycle of integrator 48-$n$ is much less than $\pi$. One can relate this phase error to a timing error through the relationship:

$$\Delta\phi = 2\pi f \Delta t$$

This can be rearranged to yield:

$$\Delta t = \frac{\Delta\phi}{2\pi f}$$

Putting $\Delta\phi = \pi$ and $f = 1.575 \times 10^9$ Hz (the GPS L1 carrier frequency), one arrives at a timing error of:

$$\Delta t = \frac{1}{3.15 \times 10^9} \approx \times 10^{-10} \text{ seconds, or 300 ps.}$$

If one takes the exemplary case where an integration cycle lasts 20 ms (it is typically in the range 1 to 200 ms), then, in order to constrain the system such that the phase shift between signals 40 and 50-$n$ does not build to $\pi$ over the course of an integration cycle, the fractional timing error would need to be less than:

$$\frac{3 \times 10^{-10}}{2 \times 10^{-2}} \approx 1.5 \times 10^{-8}$$

This is an upper limit for a short integration cycle. Therefore, in practice it would be desirable to have a fractional timing error about 5 times smaller, i.e. about $3 \times 10^{-9}$, which is 0.003 parts per million (ppm).

This is quite a stringent limitation on frequency drift even for a temperature controlled crystal oscillator to satisfy. Therefore, one would normally expect to have to design the GPS receiver 10 to take account of the slight drift in the output frequency of crystal oscillator 26.

Figure 3:
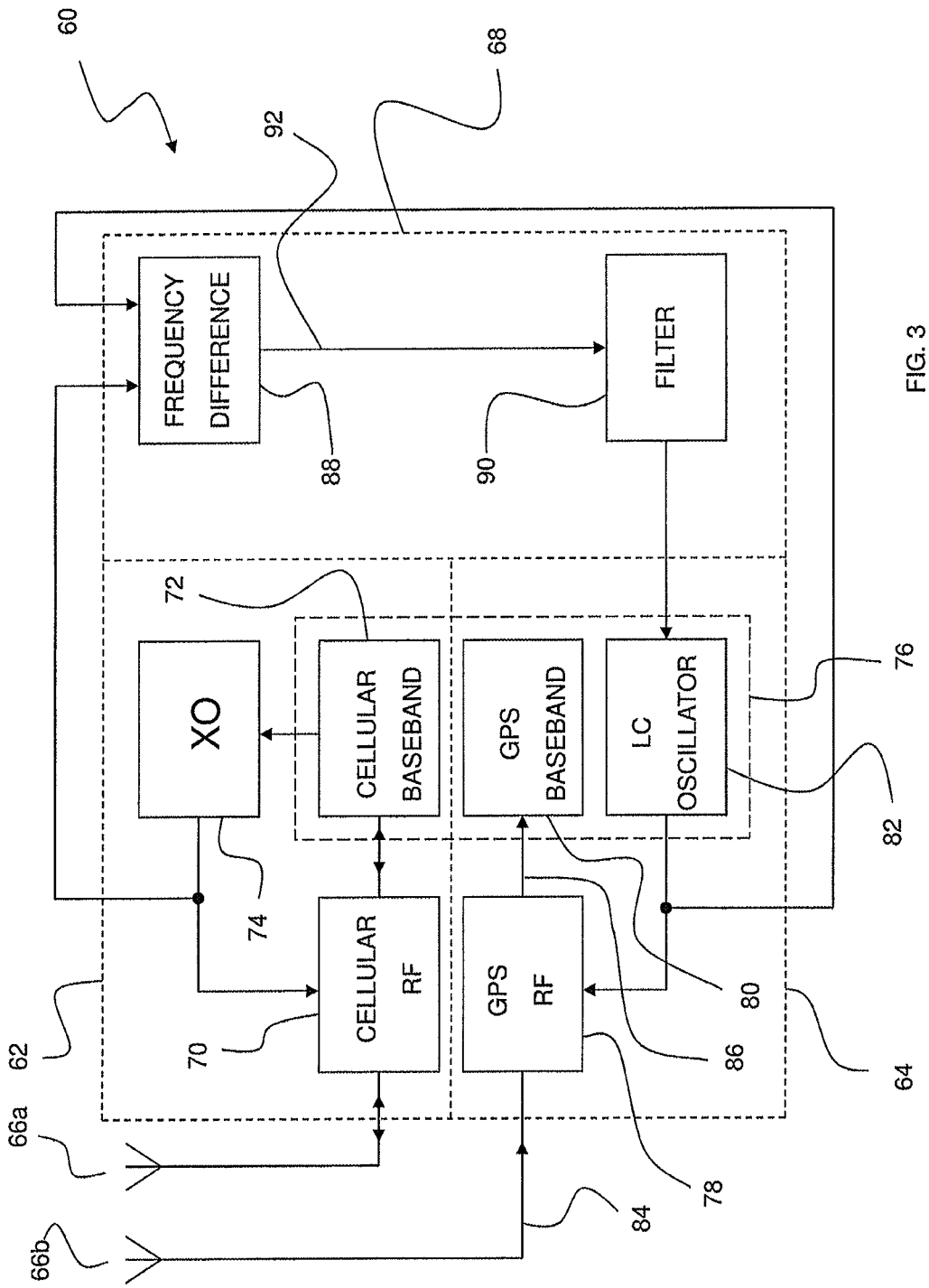
FIG. 3 is a schematic illustration of a radio telephone.

FIG. 3 shows a radio telephone 60 operating, in this example, according to the GSM standard. The telephone 60 therefore includes a cellular subsystem 62 for conducting radio communications in accordance with the GSM standard. However, the telephone 60 also includes a GPS subsystem 64 for determining the location of the telephone 60 such that location based services can be provided to the user of the telephone. The cellular and GPS subsystems 62 and 64 have respective antennae 66$a$ and 66$b$. The telephone 60 also comprises a frequency control loop 68, whose constitution and purpose will be described later.

The cellular subsystem 62 is of known design. Briefly, the cellular subsystem 62 comprises an RF "front end" section 70, a baseband section 72 and a crystal oscillator 74. The cellular RF front end 70 is responsible for tasks such as filtering, frequency conversion and amplification of signals travelling to and from the antenna 66$a$. The cellular baseband section 72 performs digital signal processing on signals that are destined for, or have been received from, the antenna 66$a$. For example, in the case of an outgoing voice signal, the cellular baseband section 72 compresses digitised speech for efficient transmission and adds forward error correction coding. The cellular baseband section 72 is integrated into a silicon chip 76.

Each frequency conversion process within the cellular RF front end 70 is achieved by using a mixer and a suitable local oscillator signal. Local oscillator signals generated within the RF front end 70 are stabilised by being locked to the crystal oscillator 74. That is to say, the crystal oscillator 74 is a reference oscillator for the cellular subsystem 62.

In operation, the cellular subsystem 62 will periodically receive frequency control bursts (FCBs) from a nearby base station. The cellular subsystem 62 uses the FCBs in a known manner to measure a frequency error in the output signal of the crystal oscillator 74.

The deduced frequency error is processed by the cellular baseband section 72 to derive a control signal that is applied to the crystal oscillator 74 to correct the latter's output frequency. Therefore, the output signal of the crystal oscillator 74 will periodically jump in frequency in accordance with the periodic processing of FCBs by the cellular subsystem 62. Normally, the FCBs keep the output frequency of the crystal oscillator 74 within ±0.1 ppm of its ideal value and the jumps in that frequency due to the FCBs are some reasonable fraction of 0.1 ppm.

The GPS subsystem 64, in analogy with the cellular subsystem 62, comprises a GPS RF front end 78, a GPS baseband section 80 and a reference oscillator 82, albeit of the LC (inductor-capacitor) type. The GPS RF front end 78 operates in a known manner and is, for example, responsible for filtering, amplifying and frequency down converting the signal 84 provided by antenna 66$b$, which may include radio signals from GPS satellites. The down conversion within the GPS front end 78 is conducted with one or more local oscillator signals synthesised within the GPS front end 78 and locked to the output frequency of the LC oscillator 82. The LC oscillator 82 and the GPS baseband section 80 are also integrated into the silicon chip 76.

The GPS RF front end 78 delivers to the GPS baseband section 80 a signal 86 that is an IF version of signal 84 and is analogous to signal 38 in FIG. 1. In GPS baseband section 80, signal 86 is converted into a complex-valued, digital signal which is then processed to derive an estimate of the position of the telephone 60. The processing that is performed on the digital version of signal 86 within the GPS baseband section 80 is the same as that which is performed in the digital processing section 20 of FIG. 1 on signal 40. The despreading processes that are therefore performed in GPS baseband section 80 to recover GPS satellite payload signals will therefore be sensitive to error in the frequency of the output of the LC oscillator 82, just as frequency error in the output of crystal oscillator 26 impinged upon correct operation of integrator 48-$n$ in FIG. 2. Hence, the telephone 60 includes frequency control loop 68, which attempts to suppress frequency error in the output of the LC oscillator 82.

The frequency control loop 68 comprises a frequency control circuit 88 and a filter 90. The frequency control circuit 88 measures the difference between the frequency of the output of the crystal oscillator 74 within the cellular subsystem 62 and the frequency of the output of the LC oscillator 82 in the GPS subsystem 64. This latter frequency has an ideal value and the control circuit 88 sends the LC oscillator 82, via the filter 90, a signal 92 whose voltage indicates the departure of the frequency difference from the ideal value. This signal 92 is used to tune the LC oscillator 82 so as to eliminate the aforementioned departure. The filter 90 modifies the signal 92 emitted by the control circuit 88 so as to limit the rate of change imposed upon the output frequency of the LC oscillator 82. That is to say, the filter 90 performs slew rate limiting on the signal 92.

As the skilled person will be aware, the LC oscillator 82 that is used as a reference oscillator for the GPS subsystem 64 is much more prone to output frequency drift than the crystal oscillator 74 that acts as a reference oscillator for the cellular subsystem 62 (and in any event the crystal oscillator 74 is corrected using the FCB data). The frequency control loop 68 aims to control and substantially suppress the frequency drift in the output signal of the LC oscillator 82.

It will be recalled that the LC oscillator 82 functions as the reference oscillator for the down conversion process that produces signal 86, from which the GPS baseband section 80 will seek to despread GPS satellite payload signals. As explained earlier, the despreading of a spread payload signal will be degraded if, over the course of an integration cycle, a phase difference of π can build between the spread payload signal and signal that provides the cyclically repeating Gold code. Thus, the slew rate limiting filter 90 is designed to restrain the rate of change of frequency of the LC oscillator 82 to prevent the output signal of the LC oscillator 82 changing the phase of signal 86 by as much as π over the course of an integration cycle of the despreading processes in the GPS baseband section 80.

Figure 4:
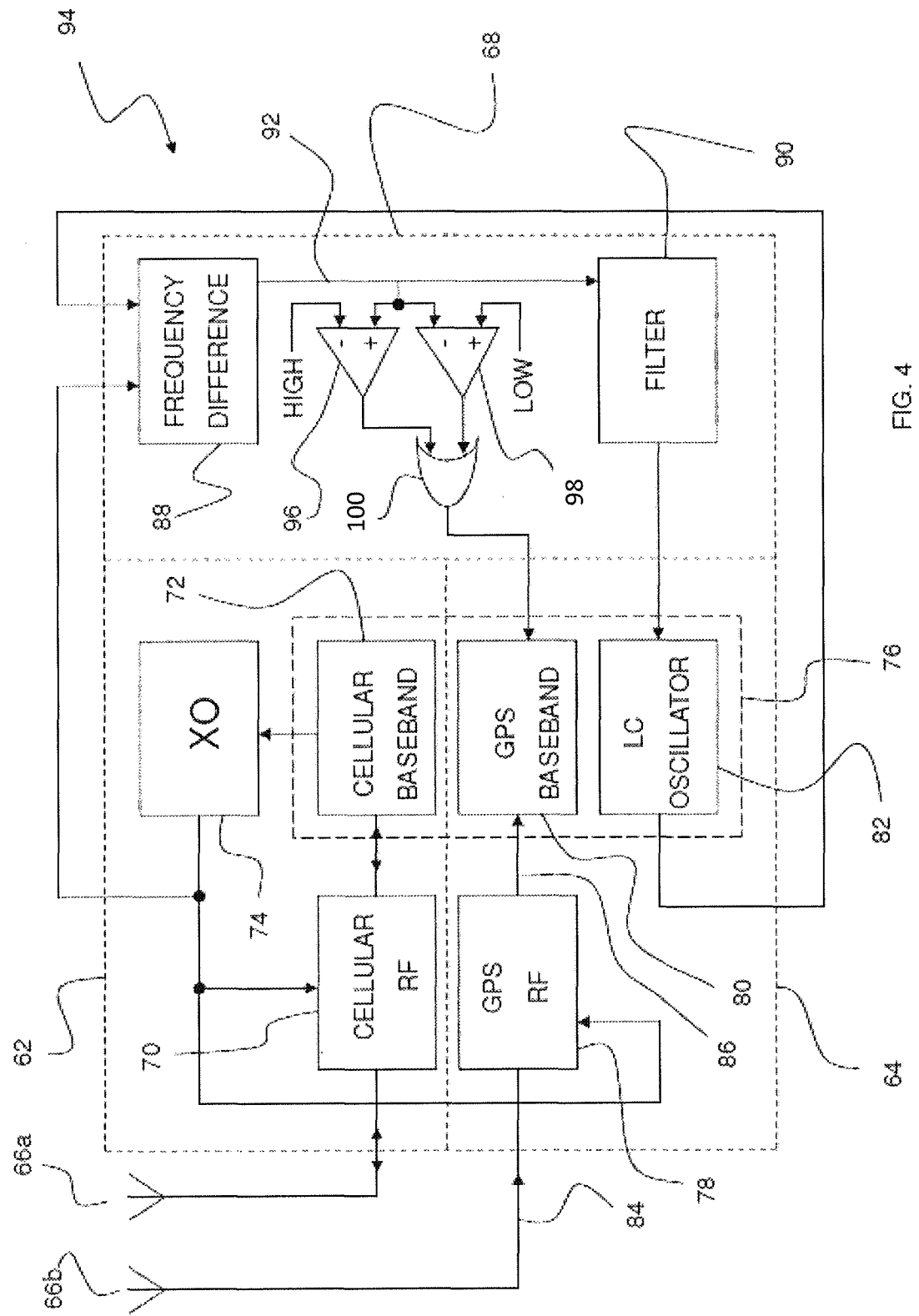
FIG. 4 is a schematic illustration of a variant of the radio telephone of FIG. 3.

FIG. 4 illustrates a mobile telephone 94 that is a variant of the mobile telephone 60 of FIG. 3. Elements common to telephones 60 and 94 retain the same reference numerals in FIG. 4 and, for the sake of brevity, their nature and purpose will not be described again.

Referring now to FIG. 4, the crystal oscillator 74, rather than the LC oscillator 82, provides the reference signal for the GPS RF front end 78. The LC oscillator 82 in FIG. 4 could be an oscillator forming part of an FM receiver within the telephone 94 that is available for GPS frequency jump detection when it is not required for FM reception duties. The output signal from the LC oscillator 82 is now supplied only to the frequency control circuit 88. The frequency control loop 68 now additionally comprises two comparators 96 and 98 and an OR gate 100. The comparators 96 and 98 monitor for excessive drift in the output frequency of the LC oscillator 82. The operation of the telephone 94 will now be described.

The control signal 92 developed by the frequency control circuit 88 is zero if the output frequencies of the LC oscillator 82 and the crystal oscillator 74 match. If the output frequency of the crystal oscillator 74 exceeds that of the LC oscillator 82, then the control signal 92 becomes positive by an amount dependent upon the size of the frequency discrepancy. Comparator 96 compares the voltage of the control signal 92 against a threshold voltage and the result is passed to the OR gate 100. The threshold used by comparator 96 is a voltage that would most likely be exceeded by the control signal 92 if the output frequency of the crystal oscillator 74 were to jump above the output frequency of the LC oscillator 82 due to processing of a FCB by the cellular baseband section 72.

If the output frequency of the crystal oscillator 74 falls below that of the LC oscillator 82, then the control signal 92 becomes negative by an amount dependent upon the size of the frequency discrepancy. Comparator 98 compares the voltage of the control signal 92 against another threshold voltage and the result is also passed to the OR gate 100. The threshold used by comparator 98 is a voltage that would most likely not be attained by the control signal 92 if the output frequency crystal oscillator 74 were to jump below the output frequency of the LC oscillator 82 due to processing of a FCB by the cellular baseband section 72.

As stated above, the OR gate 100 receives the outputs of the comparators 96 and 98. If either of these inputs to the OR gate 100 is high, then the OR gate issues a reset signal to the GPS baseband section 80. The GPS baseband section 80 is therefore informed of any jumps in the output frequency of the crystal oscillator 74 above a certain size and which were likely triggered by FCBs. The GPS baseband section 80 then aborts any integration cycles of payload signal despreading processes that utilise a part of the IF signal 86 that was down converted during a detected frequency jump. In this way, integration cycle results that are likely to be degraded by relatively large jumps in the frequency of the crystal oscillator 74 can be prevented from being used in the determination of position by the GPS subsystem 64.

In a variant of the telephone 94, integration cycles of payload signal despreading processes that span a detected frequency jump are not discarded. Rather, the accumulation value reached by an integration cycle just prior to occurrence of a detected frequency jump is saved and made available for GPS calculations. For example, the non-coherent integral $S_{int}$ could be modified as follows in order to take account of the possible truncation of integration cycles:

$$S_{int} = \sum_i \left( \frac{I_{int,i}^2 + Q_{int,i}^2}{T_i} \right)$$

$T_i$ is the duration of the integration that produced $I_{int,i}$ and $Q_{int,i}$.

Figure 5:
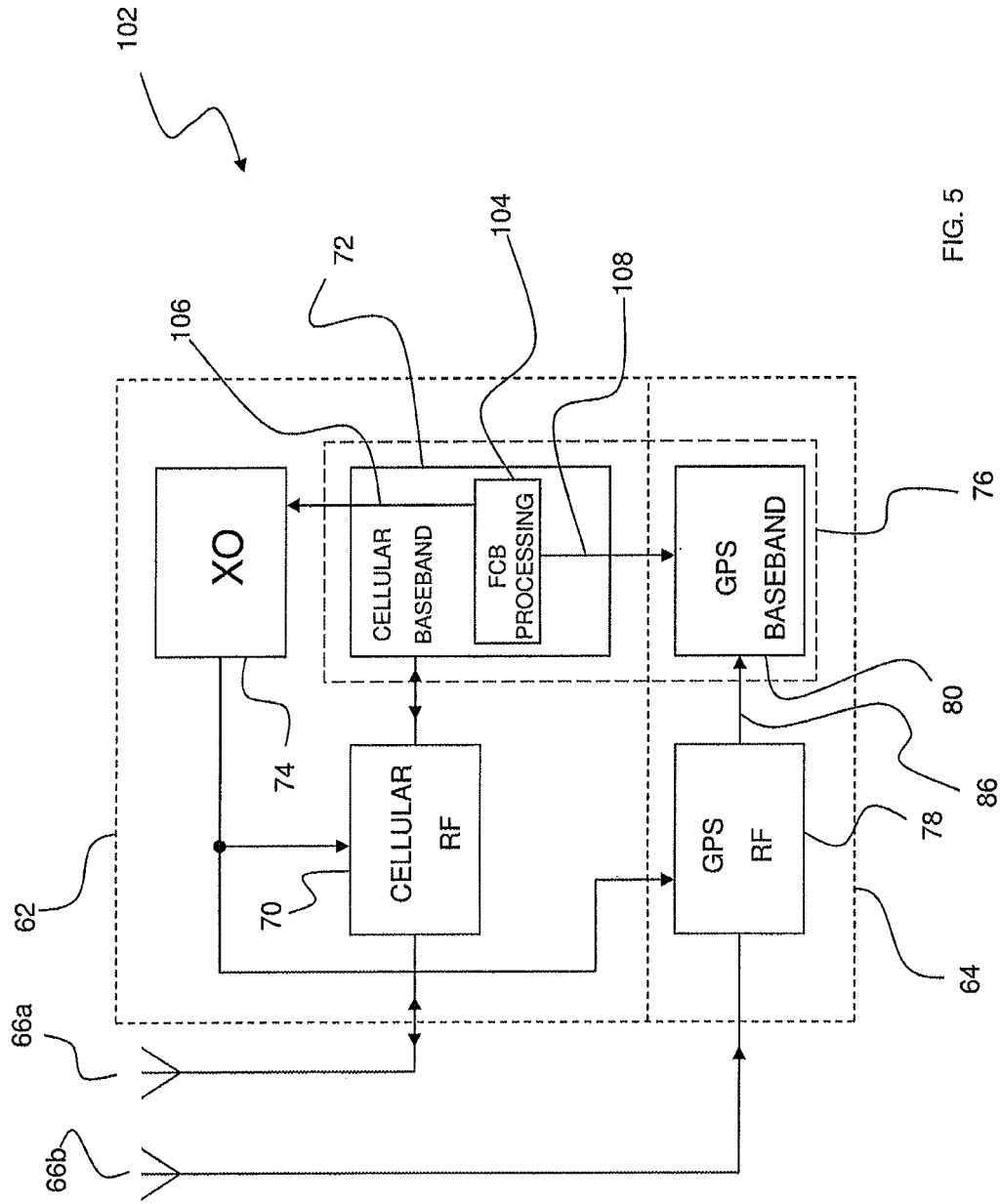
FIG. 5 is a schematic illustration of a variant of the radio telephone of FIG. 4.

FIG. 5 illustrates a mobile telephone 102 that is a variant of the mobile telephone 94 of FIG. 4. Elements common to telephones 102 and 94 retain the same reference numerals in FIG. 5 and, for the sake of brevity, their nature and purpose will not be described again.

Referring now to FIG. 5, the telephone 102 has been simplified by omitting the frequency control loop 68 and the oscillator 82. The GPS RF front end 78 continues to be regulated by the crystal oscillator 74 of the cellular subsystem 62. FIG. 5 shows the functional unit 104 within the cellular baseband section 72 that is responsible for processing FCBs. In a known manner, the FCB processing unit 104 processes received FCBs to derive control signals that are sent on path 106 to correct the output frequency of the crystal oscillator 74. The FCB processing unit 104 is also arranged to inform the GPS baseband section 80 over path 108 about the timing of the adjustments that are being made to the output frequency of the crystal oscillator 74. In a manner similar to telephone 94, the GPS baseband section 80 within telephone 102 is arranged to abort any integration cycles of payload signal despreading processes that, according to the information received over path 108, include one or more jumps in the output frequency of the crystal oscillator 74. As in telephone 94, the value of an accumulation reached in an aborted integration cycle of a payload signal despreading process can be discarded or used in truncated form in telephone 102.

Figure 6:
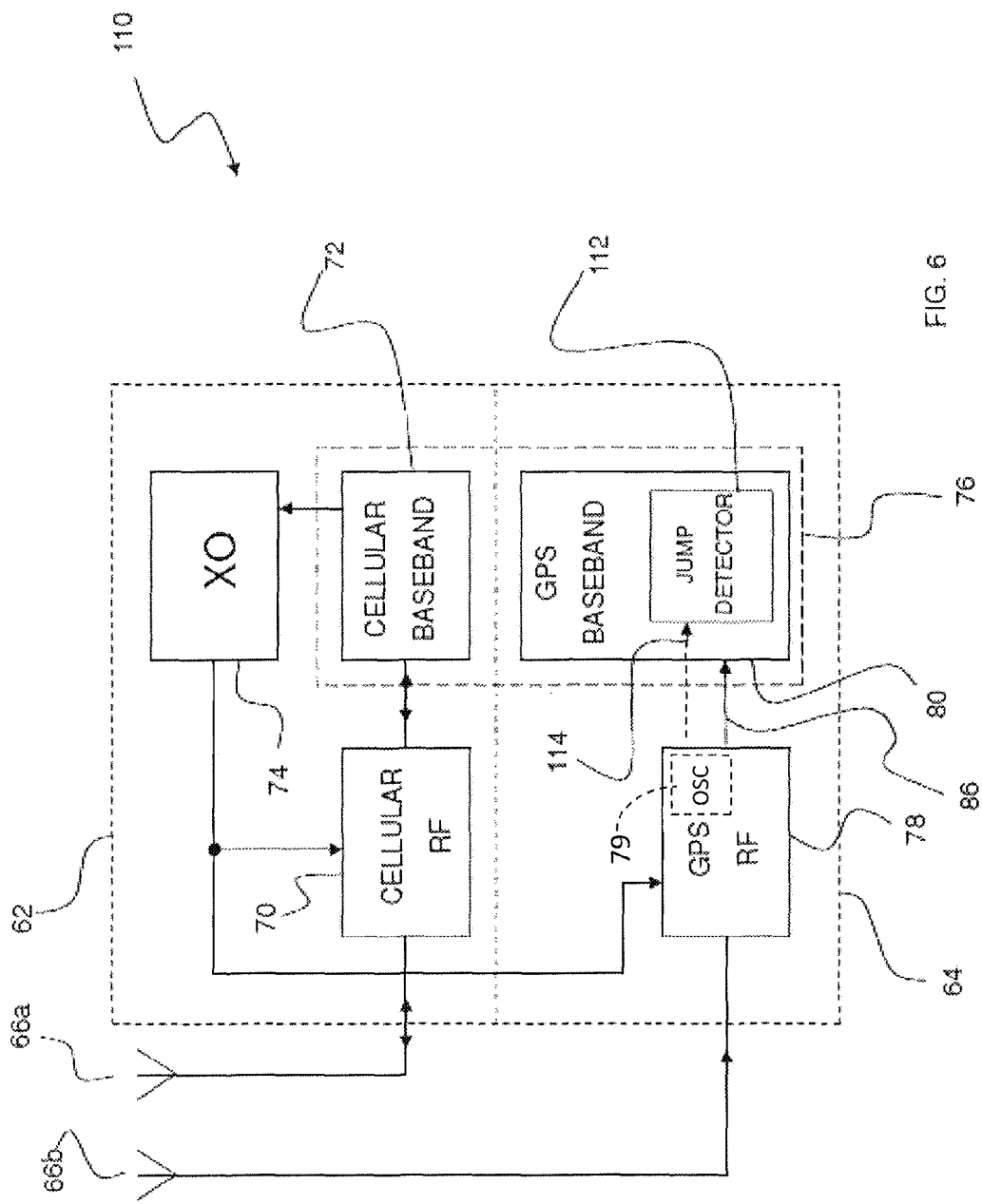
FIG. 6 is a schematic illustration of a variant of the radio telephone of FIG. 4.

FIG. 6 illustrates a mobile telephone 110 that is a variant of the mobile telephone 94 of FIG. 4. Elements common to telephones 110 and 94 retain the same reference numerals in FIG. 6 and, for the sake of brevity, their nature and purpose will not be described again.

Referring now to FIG. 6, the telephone 110 has again been simplified by omitting the frequency control loop 68 and the oscillator 82. The GPS RF front end 78 continues to be regulated by the crystal oscillator 74 of the cellular subsystem 62 and the GPS baseband section 80 now includes a jump detection unit 112 for detecting jumps in the output frequency of the crystal oscillator 74 by monitoring a target signal 114 for a difference in frequency over time as the signature of a jump in the output frequency. The target signal 114 is supplied from, or is derived from a signal that is supplied from, the GPS RF front end 78 and is a signal which will be affected by jumps in the output frequency of the crystal oscillator 74. For example, the target signal 114 could be the output signal of a local oscillator 79 (shown in phantom) in the GPS RF front end 78 that is tied to the crystal oscillator 74 as a reference frequency source or the target signal 114 could be despread payload signal (e.g., like the signal 58-$n$ in FIG. 2).

Figure 7:
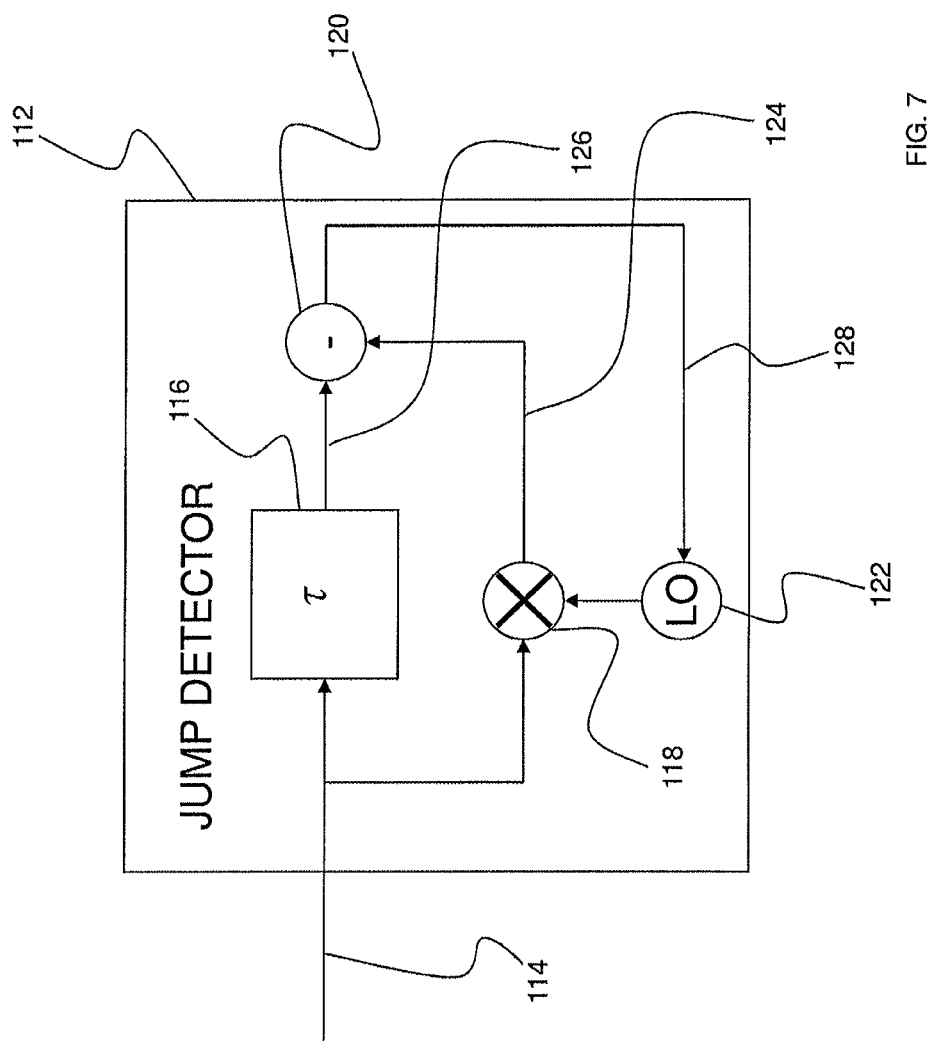
FIG. 7 is a schematic illustration of the jump detection unit within the radio telephone of FIG. 6.

As shown in FIG. 7, the jump detection unit 112 comprises a delay element 116, a multiplier 118, a subtractor 120 and a local oscillator 122. The multiplier 118 multiplies the target signal 114 with the output signal of local oscillator 122, thereby producing a signal 124 which is a frequency shifted version of the target signal 114. The delay element 116 produces a signal 126 that is a version of the target signal 114 delayed by a period T and the subtractor 120 subtracts signal 124 from signal 126 in order to produce an error signal 128. This error signal 128 is then used to control the output frequency of the local oscillator 122, so that a control loop is established. The local oscillator 122 is designed, in a known manner, to respond to the error signal 128 by attempting to drive that signal to zero: in other words, the control loop aims to eliminate any frequency discrepancy occurring between the target signal 114 as it currently stands and the version of that signal as it stood a time T into the past. In trials, frequency jumps of 10 to 500 Hz have been observed, which translates to a timing error in the range $\frac{1}{15}$ to $\frac{1}{500}$ of a second, suggesting that T should be able to extend over this range.

Thus, the output frequency of the local oscillator 122 is a measure of the frequency change that has occurred in the target signal 114 over the previous time T. If the jump detection unit 112 detects the magnitude of the output frequency of local oscillator 122 exceeding a threshold, then the jump detection unit 112 indicates that a deleterious jump has occurred. In a manner similar to telephone 94, the GPS baseband section 80 within telephone 110 is arranged to abort any coherent integration cycles of payload signal despreading processes that, according to the jump detection unit 112, include one or more deleterious jumps in the output frequency of the crystal oscillator 74. As in telephone 94, the value of an accumulation reached in an aborted integration cycle of a payload signal despreading process can be discarded or used in truncated form in telephone 110.

The threshold applied by the jump detection unit 112 to the magnitude of the output frequency of local oscillator 122 is set having regard to the design parameters of the GPS subsystem 64. For example, the threshold could be set as the size of the crystal oscillator frequency jump that would cause a phase difference of $0.8\pi$ to build over the maximum that is expected for the period of time taken by the GPS baseband section 80 to perform an integration cycle in a payload signal despreading process.

Figure 8:
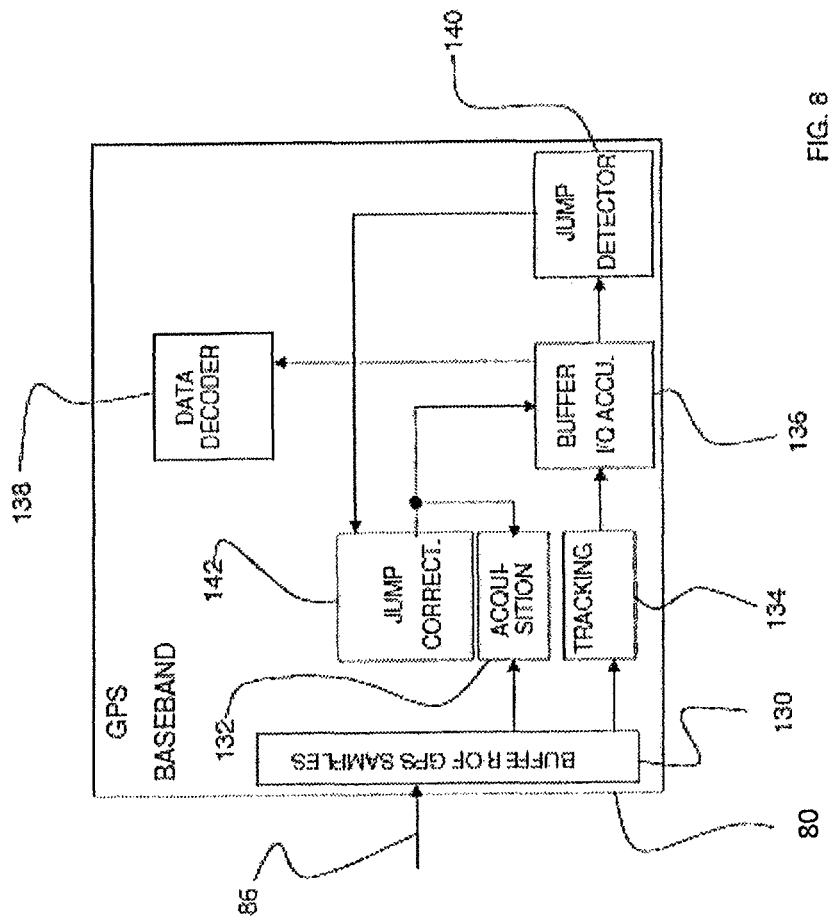
FIG. 8 is a schematic illustration of a different design for the GPS baseband section of the radio telephone of FIG. 4.

FIG. 8 shows a different implementation of the GPS baseband section 80 that deals with crystal oscillator frequency jumps in a different manner. In the implementation shown in FIG. 8, the GPS baseband section 80 comprises an IF (intermediate frequency) buffer 130, an acquisition unit 132, a tracking unit 134, a baseband buffer 136, a decoder 138, a jump detector 140 and a jump correction unit 142. These elements may be implemented as hardware in the silicon chip 76 or some or all of them may be implemented in software as functions performed by a processor that provides all or part of the GPS baseband section 80.

The IF output signal 86 of the GPS RF front end 78 is digitised (into complex-valued samples) and is written into the IF buffer 130. The acquisition unit 132 and the tracking unit 134 read the IF signal 86 from the IF buffer 130. The acquisition unit 132 processes the buffered part of the IF signal 86 in known fashion to find or acquire therein signals from GPS satellites. The tracking unit 134 processes the buffered part of the IF signal 86 to recover despread payload signals for each of the satellites that has been identified by the acquisition unit 132 as being present in the signal 86. The tracking unit 134 implements a tracking function of the kind illustrated in FIG. 2 for each payload signal that is to be recovered from the buffered part of the IF signal 86. The despread payload signals produced by the tracking unit 134 are then written into the baseband buffer 136.

The despread payload signals are then read from the baseband buffer 136 and processed by a data decoder 138, in known fashion, to recover the GPS words that they contain, and from which words the position of the GPS receiver can be deduced. The despread payload signals are also read from the baseband buffer 136 by the jump detector 140, which uses them to detect the timing and size of jumps in the output frequency of the crystal oscillator 74. Such jumps as are detected by the jump detector 140 are communicated to the jump correction unit 142, which then makes appropriate corrections to the operation of, on the one hand, the acquisition unit 132 and to the despread payload signals in the baseband buffer 136 or, on the other hand, the buffered part of the IF signal 86 residing in the IF buffer 130. Where these corrections are made depends on the state of the switch 144. The process of jump detection and jump correction will now be explained with reference to FIG. 9.

Figure 9A:
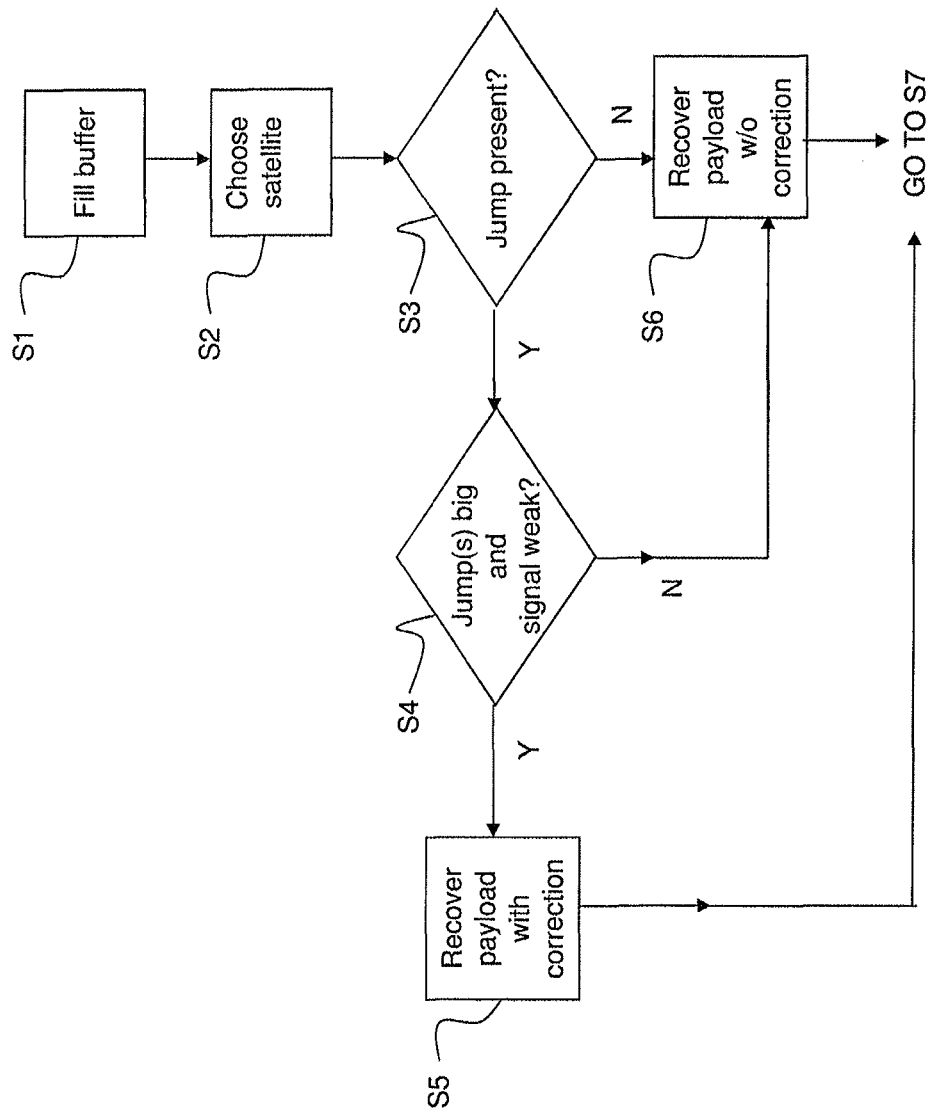
FIGS. 9A and 9B collectively show a flow chart explaining the operation of the GPS baseband section whose design is shown in FIG. 8.
Figure 9B:
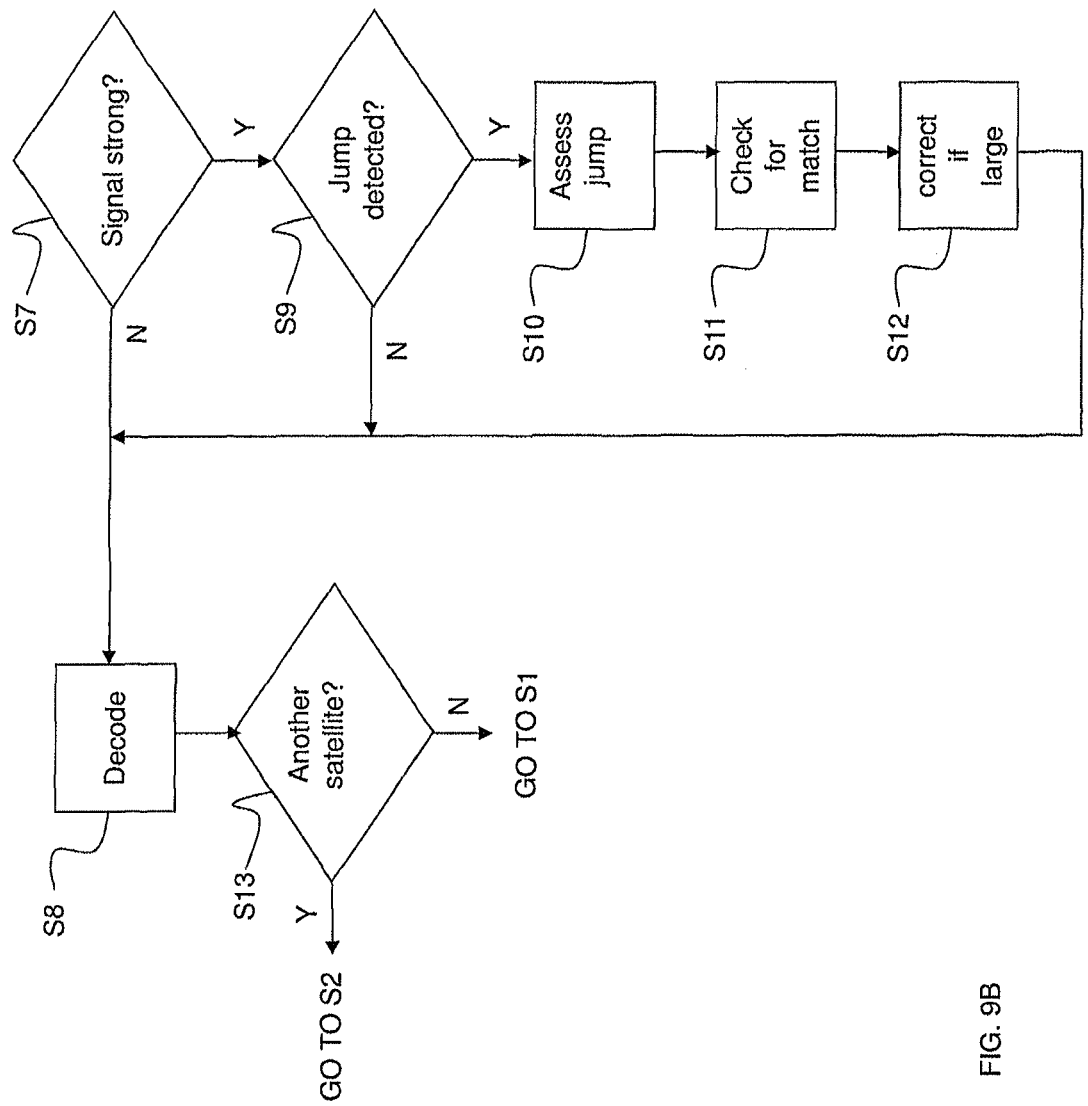

In step S1 of FIG. 9, a part of the IF signal 86 long enough (say 200 ms) to cover several periods of the Gold code (1 ms) that is used by the satellites to spread their payload signals is captured in the IF buffer 130. The part of the IF signal 86 that has been written into the IF buffer 130 is processed by the tracking unit 134, which writes into the baseband buffer 136 the despread payload signal or signals that correspond to the part of the IF signal 86 that has been written into the IF buffer 130.

In step S2, one of the tracked satellites whose payload signal is yet to be despread from the buffered part of the IF buffer 86 is selected. The selection can be made on the basis of one or more of several criteria. For example, the satellite whose despread payload signal appeared strongest in the time slot of the IF signal 86 preceding the time slot currently buffered in the IF buffer 130 can be selected. The strength of a despread payload signal can be judged in terms of its CNo (carrier to noise ratio). It is useful to select a satellite based on signal strength, since the stronger a satellite's payload signal, the more accurately the timing and size of any crystal oscillator frequency jumps can be measured. As another example, the satellite with the highest elevation can be selected. It is useful to select a satellite based on elevation, since the higher a satellite's elevation, the smaller the Doppler shift will be in the signal from that satellite as perceived by the GPS receiver 10, and the more accurately the timing and size of any crystal oscillator frequency jumps can be measured.

In step S3, it is checked whether any jumps have already been identified from the despread payload signals in the baseband buffer 136. Of course, if the satellite selected in step S2 is the first one for which the currently buffered time slot of the IF signal is to be processed, then no jumps will have been identified at this point. If one or more jumps have already been identified from the currently buffered time slot of the IF signal, then the process moves to step S4, otherwise it moves to step S6.

If a known jump is smaller than the threshold frequency amount and the signal is historically strong (based on, for example, the CNo value of the payload signal in one or more time slots of the IF signal 86 preceding the time slot now buffered in the buffer 130), then it is assumed that the jump should be capable of being corrected by the normal "pull in" action of the carrier tracking loop that controls the estimated residual carrier signal. Therefore, in step S4, it is checked whether the selected satellite's despread payload signal is historically weak and whether any of the already known jumps affecting the currently buffered time slot of the IF signal 86 are large relative to the threshold frequency amount. If either the despread payload signal is historically weak or any of the known jumps are large, then the process moves to step S5, otherwise it moves to step S6.

In step S6, the presently buffered time slot of the IF signal 86 is read from the IF buffer and is processed by a tracking function of the kind illustrated in FIG. 2 to recover a despread payload signal for the selected satellite. The payload signal thus recovered is then written into the baseband buffer 136. From step S6, the process moves to step S7.

The processing performed in step S5 is the same as that performed in step S6 except in that the buffered time slot of the IF signal 86 is corrected for any known, large crystal oscillator jumps as it is subjected to the tracking function. This correction is achieved by adjusting the frequency of the estimated residual carrier signal (i.e., signal 50-$n$ in FIG. 2) as will now be explained. When a part of the buffered part of IF signal 86 that is affected by one or more known, large jumps passes through the multiplier that is attempting to complete the down conversion of the spread payload signal to baseband (i.e., multiplier 44-$n$ in FIG. 2), the frequency of the estimated residual carrier signal is stepped up or down as is necessary in order to compensate for the one or more known, large jumps that affect that part. In this way, the buffered part of the IF signal 86 continues to be accurately down converted to baseband in step S5. The satellite's payload signal is then recovered by the tracking function by despreading and is written into the baseband buffer 136. From step S5, the process moves to step S7.

In step S7, the process checks whether the payload signal despread in step S5 or S6 is strong. For example, this can be done by calculating CNo of the payload signal and comparing that value to a threshold. If the payload signal is deemed weak, then the process moves to step S8, otherwise the process moves to step S9.

In step S9, the despread payload signal from step S5 or S6 is examined for evidence of crystal oscillator frequency jumps. The despread payload signal is subjected to a fast Fourier transform (FFT) and the resulting spectrum is analysed. The heights $h_1$ and $h_2$ of highest and second highest peaks respectively in the spectrum are compared by calculating $h_1/h_2$. If $h_1/h_2$ exceeds a threshold, then a significant jump is declared to be present in the despread payload signal and the process moves to step S10. If $h_1/h_2$ does not exceed the threshold, then the process moves to step S8.

In step S10, a jump in frequency equal to the frequency separation $\Delta f$ of the $h_1$ and $h_2$ peaks is deemed to have occurred. The time of occurrence of this jump is then determined, as follows. The despread payload signal is treated as being divided into increments each containing one or more consecutive complex samples of the despread payload signal. Then, multiple test signals are created, each based on a different one of the increments. More specifically, each test signal comprises the despread payload signal with a modification applied to the part of the despread payload signal that extends from the start of the increment associated with that test signal. The modification comprises by multiplying the selected part of the despread payload signal with a signal of frequency $\Delta f$. Then, the power present in the test signals is calculated and the test signal with the highest power is taken to indicate the timing of the $\Delta f$ jump. That is to say, the $\Delta f$ jump is deemed to have occurred at the start of the increment that is associated with the test signal that has the greatest power. Having identified the timing and size of a jump, the process moves to step S11.

In step S11, the size and timing of the jump identified in step S11 is compared against jumps that have already been recognised whilst despreading payload signals of other tracked satellites from the buffered part of the IF signal 86. This check helps to eliminate falsely detected jumps. The process moves from step S11 to step S12.

In step S12, the process compares the jump $\Delta f$ to the threshold frequency amount that was used in step S4. If $\Delta f$ exceeds this threshold, then the despread payload signal created by step S5 or S6 is corrected for the $\Delta f$ jump. Essentially, the winning test signal from step S10 is used as the corrected form of the despread payload signal. If, on the other hand, $\Delta f$ does not exceed the threshold frequency amount, the despread payload signal is not corrected for the $\Delta f$ jump. This is because the threshold frequency amount is chosen to indicate the maximum jump size that can be corrected through the normal "pull in" action of the carrier tracking loop. From step S12, the process moves to step S8.

In step S8, the payload signal that was despread in step S5 or S6 or, as the case may be, the version of that signal as corrected in step S12, is provided to the decoder 138. The decoder 138 processes the payload signal to recover the GPS words that it contains. The GPS words so obtained can then be used together with GPS words from other satellites' payload signals in order to calculate the position of the GPS receiver 10. From step S8, the process moves to step S13.

In step S13, the process checks whether there are any satellites being tracked that have not yet had their payload signals despread from the currently buffered time slot of the IF signal 86. If any such satellites exist, then the process returns to step S2. If no such satellites exist, then the process moves to step S1 where the next time slot of the IF signal 86 is written into the IF buffer 130.

Figure 10:
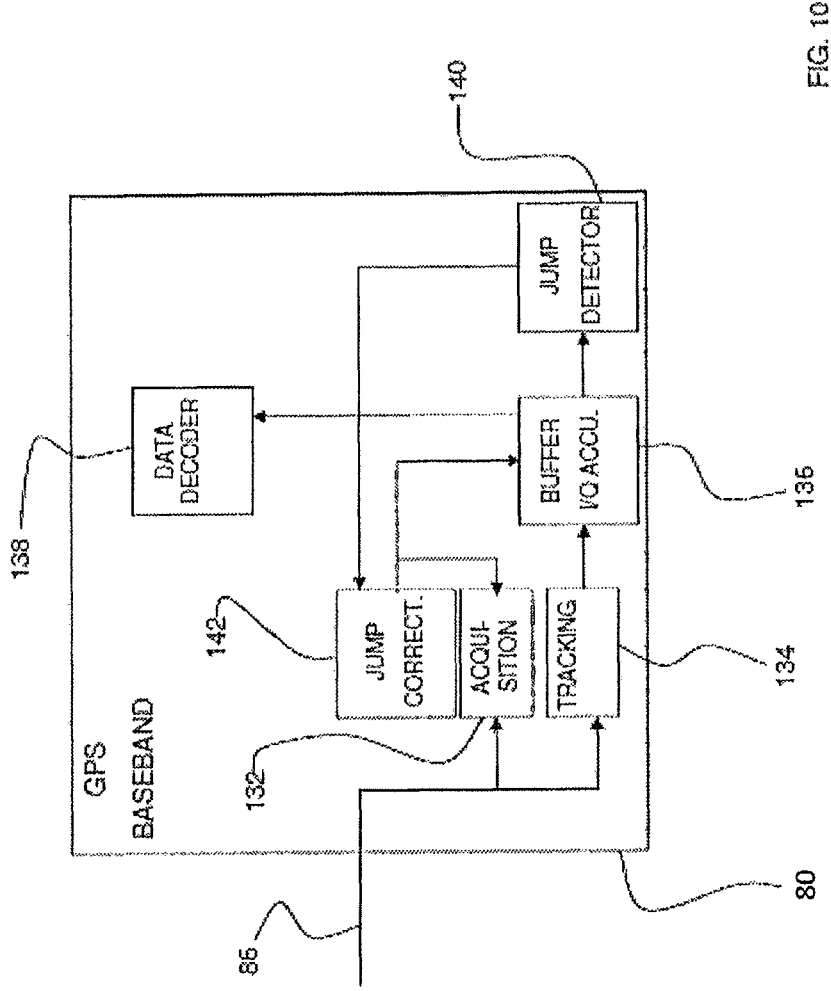
FIG. 10 is a schematic illustration of a variant of the design that is shown in FIG. 8.

FIG. 10 shows a variant of design of the GPS baseband section 80 that is presented in FIG. 9. In the design shown in FIG. 10, the IF signal 86 is not buffered, i.e. IF buffer 130 has been omitted. In the case of FIG. 9, the acquisition unit operates on the fly to identify new satellite signals that are observable in the IF signal 86. Likewise, the tracking unit 134 operates on the fly to despread the payload signals of all the satellites that are presently being tracked.

It will be apparent to a person skilled in the field of wireless communications engineering that various other modifications could be made to the described systems without departing from the scope of the invention. For example:

Elements of the telephones 60, 94, 102, and 110 besides the subsystems 72 and 80 and the LC oscillator 82 may be implemented in silicon, even within chip 76.

The subsystems 72 and 80 and the LC oscillator 82 need not be implemented in the same silicon chip although typically it is space, power and cost efficient to do so.

The LC oscillator 82 could be replaced by another type of on-chip oscillator, for example a mechanically resonant structure built within the chip.

Some of the schemes outlined above respond to a detected crystal oscillator jump by aborting or truncating an integration cycle of a payload signal despreading process, whereas other correct an affected integration cycle by frequency-correcting a part of a buffered signal and then repeating the integration cycle. Any of the methods of crystal oscillator jump detection described above can be followed by one of the described responses of truncating, aborting and correcting an integration cycle of a payload signal despreading process.

The filter 90 performs slew rate limiting on the signal provided by the frequency control circuit 88. In certain design situations, arranging the filter to perform low pass filtering of that signal may suffice to prevent the accumulation of the unwanted phase shift of .pi. radians during an integration cycle.

In the design of the GPS section 80 that is described with reference to FIGS. 8 and 9, frequency jumps are taken into account in the acquisition unit 132 and by correcting signals in the baseband buffer 136. As an alternative, the part of the IF signal 86 that is buffered in the IF buffer 130 can be corrected for identified jumps.

The invention claimed is:

1. A radio communications device comprising:
a satellite positioning subsystem arranged to determine the device's location based on satellite signals and a frequency converter arranged to apply a downshift in frequency to a received signal;
a crystal oscillator arranged to produce an output signal whose frequency acts as a controlling reference for the frequency converter, a processor arranged to intermittently correct the crystal oscillator such that the frequency of its output signal experiences jumps;
circuitry configured to detect a jump in the frequency of the output signal of the crystal oscillator;
wherein the satellite positioning subsystem is arranged to take account of a detected jump in the frequency of the output signal of the crystal oscillator when determining the device's location; and
wherein the device further comprises an additional oscillator and a controller arranged to lock the additional oscillator to the crystal oscillator, wherein the controller is arranged to develop a control signal for the purpose of controlling the additional oscillator and the circuitry configured to detect the jump in the frequency of the output signal of the crystal oscillator is arranged to monitor the control signal for a signature of a jump in the frequency of the output signal of the crystal oscillator.

2. A radio communication device according to claim 1, wherein the controller comprises a frequency control loop and the control signal is developed by that loop.

3. A radio communication device according to claim 1, wherein the circuitry configured to detect the jump in the frequency of the output signal of the crystal oscillator is arranged to monitor a rate of change of frequency of the additional oscillator that is demanded by the controller and the signature sought is the demanded rate of change exceeding a range.

4. A radio communications device according to claim 1, wherein the additional oscillator is a non-crystal oscillator.

5. A radio communications device according to claim 4, wherein the additional oscillator is an LC oscillator.

6. A radio communications device according to claim 1, wherein the circuitry configured to detect the jump in the frequency of the output signal of the crystal oscillator is arranged to analyse a target signal that has been synthesised from the output signal of the crystal oscillator in order to identify a jump in the frequency of the crystal oscillator output signal.

7. A radio communications device according to claim 6, wherein the circuitry configured to detect the jump in the frequency of the output signal of the crystal oscillator is arranged to analyse the target signal by seeking a frequency difference between the target signal and a time offset version of the target signal.

8. A radio communications device according to claim 7, wherein the circuitry configured to detect the jump in the frequency of the output signal of the crystal oscillator comprises a control loop conveying a control signal for reducing any frequency discrepancy between the target signal and the time offset version of the target signal and the circuitry configured to detect the jump in the frequency of the output signal of the crystal oscillator is arranged to monitor the control signal for the signature of the jump.

9. A radio communications device according to claim 6, wherein the circuitry configured to detect the jump in the frequency of the output signal of the crystal oscillator is arranged to deduce a spectrum of the target signal and examine the spectrum for a jump in the frequency of the output signal of the crystal oscillator.

10. A radio communications device according to claim 9, wherein the circuitry configured to detect the jump in the frequency of the output signal of the crystal oscillator is arranged to deduce the spectrum of the target signal by Fourier transformation.

11. A radio communications device according to claim 9, wherein the circuitry configured to detect the jump in the frequency of the output signal of the crystal oscillator, having detected a jump in the spectrum, is arranged to determine how the power of the target signal varies as the time point in the target signal of commencement of a frequency correction for the jump is varied and is arranged to determine the time of occurrence of the jump to be the setting of the time point that maximises the power of the target signal.

12. A radio communications device according to claim 1, wherein the satellite positioning subsystem is arranged to take account of a jump in the output frequency of the crystal oscillator by discarding one or more calculations affected by the jump.

13. A radio communications device according to claim 1, wherein the satellite positioning subsystem is arranged to take account of a jump in the output frequency of the crystal oscillator by limiting one or more calculations to a partial result reached prior to the processing of the jump.

14. A radio communications device according to claim 1, wherein the satellite positioning subsystem is arranged to take account of a jump in the output frequency of the crystal oscillator by correcting one or more calculations that have been affected by the jump.

15. A radio communications device according to claim 14, wherein the satellite positioning subsystem is arranged to recover a frequency downshifted satellite signal and the satellite positioning subsystem is arranged to take account of a jump in the output frequency of the crystal oscillator by applying to that part of the frequency downshifted satellite signal that is affected by the jump a frequency shift that corrects for the jump.

16. A radio communications device according to claim 1, further comprising a radio communications subsystem arranged to receive or send and receive signals via an air interface, wherein the crystal oscillator is arranged to act as a controlling reference for the radio communication subsystem, the processor is arranged to derive from signals received via the radio communication subsystem control information for the intermittent correction of the crystal oscillator.

* * * * *